(12) United States Patent
Guillemot et al.

(10) Patent No.: US 9,729,876 B2
(45) Date of Patent: *Aug. 8, 2017

(54) METHOD FOR PREDICTING A BLOCK OF PIXELS FROM AT LEAST ONE PATCH

(71) Applicant: THOMSON LICENSING, Issy de Moulineaux (FR)

(72) Inventors: Christine Guillemot, Chantepie (FR); Safa Cherigui, Villeurbannes (FR); Dominique Thoreau, Cesson Sevigne (FR); Philippe Guillotel, Vern sur Seiche (FR)

(73) Assignee: Thomson Licensing, Issy les Moulineaux ( * ) Notice: Subject to any disclaimer, the term of this patent is extended or adjusted under 35 U.S.C. 154(b) by 0 days.

This patent is subject to a terminal disclaimer.

(21) Appl. No.: 14/648,185

(22) PCT Filed: Nov. 26, 2013

(86) PCT No.: PCT/EP2013/074682
§ 371 (c)(1),
(2) Date: May 28, 2015

(87) PCT Pub. No.: WO2014/082982
PCT Pub. Date: Jun. 5, 2014

(65) Prior Publication Data
US 2015/0304656 A1  Oct. 22, 2015

(30) Foreign Application Priority Data

Nov. 29, 2012 (EP) .................................. 12306487
Mar. 20, 2013 (EP) .................................. 13305333

(51) Int. Cl.
G06K 9/36 (2006.01)
H04N 19/105 (2014.01)
(Continued)

(52) U.S. Cl.
CPC ......... *H04N 19/105* (2014.11); *H04N 19/154* (2014.11); *H04N 19/176* (2014.11); *H04N 19/194* (2014.11); *H04N 19/97* (2014.11)

(58) Field of Classification Search
CPC .... H04N 19/105; H04N 19/11; H04N 19/117; H04N 19/124; H04N 19/136;
(Continued)

(56) References Cited

U.S. PATENT DOCUMENTS 8,228,990 B2  7/2012  Visharam et al.
9,374,597 B2  6/2016  Thoreau et al.
(Continued)

FOREIGN PATENT DOCUMENTS

KR        101046182      6/2011
WO     WO2011002809     1/2011

OTHER PUBLICATIONS

Cherigui et al:"Correspondence Map-Aided Neighbor Embedding for Image Intra Prediction" IEEE Transactions on Image Processing,IEEE Service Center, vol. 22, No. 31 Mar. 2013 (Mar. 1, 2013)pp. 1161-1174.
(Continued)

Primary Examiner — Jose Couso
(74) Attorney, Agent, or Firm — Tutunjian & Bitetto, P.C.

(57) ABSTRACT

The present invention generally relates to a method for predicting a block of pixels from at least one patch comprising a block of pixels and a causal neighborhood around this block of pixels. The method comprises the following steps:
determining a mapping of a causal neighborhood, around that block of pixels to be predicted, on the block of pixels to be predicted in order that the block of pixels of each patch is best predicted by mapping the neighborhood of that patch on the block of pixels of that patch, and
(Continued)

Figure 1:
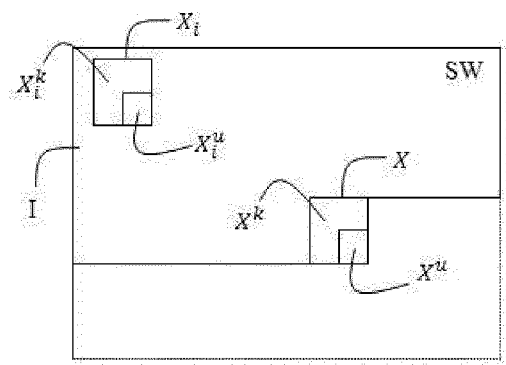

predicting the block of pixels from a prediction block computed by applying the determined mapping on the neighborhood of the block of pixels to predict.

12 Claims, 5 Drawing Sheets

(51) Int. Cl.
  *H04N 19/176* (2014.01)
  *H04N 19/154* (2014.01)
  *H04N 19/194* (2014.01)
  *H04N 19/97* (2014.01)

(58) Field of Classification Search
  CPC ............ H04N 19/19139; H04N 19/14; H04N 19/147; H04N 19/154; H04N 19/159; H04N 19/176; H04N 19/50; H04N 19/533; H04N 19/573; H04N 19/577; H04N 19/593; H04N 19/61; H04N 19/82; H04N 19/86; H04N 19/97; H04N 19/194; G06K 9/4642; G06T 1/20; G06T 9/00
  See application file for complete search history.

(56) References Cited

U.S. PATENT DOCUMENTS

| | | |
|---|---|---|
| 2005/0204065 A1 | 9/2005 | Son et al. |
| 2007/0110074 A1 | 5/2007 | Bradley et al. |
| 2007/0260634 A1 | 11/2007 | Makela et al. |
| 2009/0180538 A1* | 7/2009 | Visharam ............ H04N 19/176 375/240.15 |
| 2010/0246675 A1 | 9/2010 | Gharavi-Alkhansari et al. |
| 2014/0314330 A1* | 10/2014 | Cherigui ................... G06T 9/00 382/238 |
| 2015/0264392 A1* | 9/2015 | Thoreau ............... H04N 19/105 382/236 |

OTHER PUBLICATIONS

Huang et al:"A weighted low-rank matrix approximation based template matching scheme for inter-frame prediction" Signals and Electronic Systems (ICSES), 2012 International Conference on, IEEESep. 18, 2012 (Sep. 18, 2012)pp. 1-5.

Li et al:"Template based illumination compensation algorithm for multiview video coding", Visual Communications and Image Processing Jul. 11-14, 2010, Jul. 11, 2010 (Jul. 11, 2010), Proc. of SPIE vol. 7744 774428-7; pp. 1-8.

Bjelica et al: "Towards Ubiquitous Distributed Multimedia UPNP-Based Control and Scripting", 5th European Conference on Circuits and Systems for Communications (ECCSC 2010)IEEE; Nov. 23-25, 2010; pp. 39-42.

Lee et al: "Algorithms for non-negative matrix factorization" Advances in Neural Information Process. Syst. (NIPS), 2000.pp. 1-7.

Roweis et al: "Nonlinear dimensionally reduction by locally linear embedding" Science, vol. 290, pp. 2323-2326, Dec. 2000.

Suhring: "H.264/AVC Reference Software"; Apr. 7, 2015, p. 1 only.

Tan et al: "Intra prediction by template matching" Proc. IEEE Int. Conf Image Process; 2006 IEEE, pp. 1693-1696.

Turkan et al: "Image prediction based on neighbor embedding methods" IEEE Trans. on Image Processing, vol. 21, No. 4, pp. 1885-1898, Apr. 2012.

Wong et al: "A nonlocal-means approach to exemplar-based inpainting" iEEE int. Conf image Process. (ICIP), 2008, pp. 2600-2603.).

Richardson et al: "H.264 and MPEG-4 Video Compression"; 2003; pp. 1-7.

Kamp et al: "Decoder Side Motion Vector Derivation" Shenzhen in China, 33ième meeting of the group VCEG of l'ITU-T; pp. 1-4.

Cherigui, et al., "Hybrid Template and Block Matching Algorithm for Image Intra Prediction", ICASSP 2012, Jul. 2012, pp. 781-784.

Guillemot, et al.,"Neighbor Embedding with Non-Negative Matrix Factorization for Image Prediction", ICASSP2012, Jul. 2012, pp. 785-788.

Cherigui, et al., "Map-Aided Locally Linear Embedding Methods for Image Prediction", ICIP 2012, Jul. 2012, pp. 2909-2912.

* cited by examiner

METHOD FOR PREDICTING A BLOCK OF PIXELS FROM AT LEAST ONE PATCH

This application claims the benefit, under 35 U.S.C. §365 of International Application PCT/EP2013/074682, filed Nov. 26, 2013, which was published in accordance with PCT Article 21(2) on Jun. 5, 2014 in English and which claims the benefit of European patent applications No. 12306487.5, filed Nov. 29, 2012 and Ser. No. 13/305333.0, filed Mar. 20, 2013.

1. FIELD OF INVENTION

The present invention generally relates to video coding and decoding. In particular, the technical field of the present invention is related to prediction of a block of pixels of an image.

2. TECHNICAL BACKGROUND

Intra prediction is a key component of image and video compression methods. Given observations, or known samples in a spatial neighborhood, the goal of intra prediction is to estimate unknown pixels of the block to be predicted.

For example, in H.264/AVC Karsten Suhring, H.264/AVC Reference Software, http://iphome.hhi.de/suehring/tml/download/, the book of I. E. Richardson titled <<H.264 and MPEG-4 video compression>> published in J. Wiley & Sons in September 2003, there are two intra-frame prediction types called Intra-16×16, Intra-8×8 and Intra-4×4. Each 4×4 block is predicted from prior encoded (and reconstructed) pixels of spatially neighboring blocks. In addition to the so-called "DC" mode which consists in predicting the entire 4×4 block from the mean of neighboring pixels, eight directional prediction modes have been specified. The prediction is done by simply "propagating (interpolating)" the pixel values along the specified direction. This approach is suitable in the presence of contours when the directional mode chosen corresponds to the orientation of the contour. However, it fails in more complex textured areas.

An alternative spatial prediction method based on template matching (TM) has been described by T. K. Tan, C. S. Boon, and Y. Suzuki, "Intra prediction by template matching," in *Proc. IEEE Int. Conf Image Pmcess.,* 2006, pp. 1693-1696. A so-called template is formed by previously encoded pixels in a close neighborhood of the block to be predicted. The best match between the template of the block to be predicted and candidate texture patches of same shape as the template, within a causal search window, allows finding the predictor of the block to be predicted.

Turkan et al. (M. Turkan and C. Guillemot, "Image prediction based on neighbor embedding methods," *IEEE Trans. on Image Processing*, vol. 21, no. 4, pp. 1885-1R9R, April 2012.) have considered neighbor embedding solutions to address the problem. An Intra prediction method using neighbor embedding first search, within a window in the causal part of the image, for the K-Nearest Neighbors (K-NN) to the template pixels of the input patch to be predicted. They then search for the best approximation of the template pixels by a linear combination of their K-NN. The method then varies in the way the coefficients of the linear combinations are computed, using similarity weights with a Gaussian kernel as in a so-called NLM-inspired method (A. Wong and J. Orchard, "A nonlocal-means approach to exemplar-based inpainting," in *iEEE int Conf image Process. (ICIP)*, 2006, pp. 2600-2603.), or using least squares approximations under a sum-to-one constraint for the weights as in a so-called LLE-based method (S. Roweis and L. Saul, "Nonlinear dimensionality reduction by locally linear embedding," *Science*, vol. 290, pp. 2323-2326, December 2000.), or under a positivity constraint as in a NMF-based approach (D. D. Lee and H. S. Seung, "Algorithms for non-negative matrix factorization," *Advances in Neural Information Process. Syst. (NIPS)*, 2000.).

Significant gains have been shown when comparing the neighbor-embedding based intra prediction against a simple template matching.

However, the K-NN patches used for the linear approximation of the input patch has obviously a strong impact on the performance. Searching for the K-NN by computing a distance on the template pixels may not lead to the best blocks for approximating the unknown pixels of the block to be predicted, especially in the case where there are discontinuities between the template and the current block.

3. SUMMARY OF THE INVENTION

In order to have K-NN patches which are similar (in terms of visual content) of an input template, while being also relevant for the block to be predicted, the present invention uses mapping functions between sub spaces corresponding to the known and unknown parts of patches. These mapping functions are learned from examplar or training patches within a reconstructed part of the image, using multivariate regression. These mapping functions are then used for computing a first estimate of the block to be predicted (unknown pixels). This first estimate is then used to help the K-NN search, so that the K-NN blocks considered in the neighbor embedding are relevant for the block to be predicted and not only to its template.

The invention comprises a method for predicting a block of pixels from at least one patch comprising a block of pixels and a causal neighborhood around this block of pixels. The method is characterised in that it comprises the following steps:
  determining a mapping of a causal neighborhood, around that block of pixels to be predicted, on the block of pixels to be predicted in order that the block of pixels of each patch is best predicted by mapping the neighbourhood of that patch on the block of pixels of that patch, and
  predicting the block of pixels from a prediction block computed by applying the determined mapping on the neighbourhood of the block of pixels to predict.

According to an embodiment, the mapping is determined by using a linear regression approach.

According to an embodiment, the linear regression problem is solved by least squares minimising at least one prediction error between the block of pixels of a patch and a block resulting of the mapping the neighbourhood of that patch on said block of pixels.

According to an embodiment, the linear regression problem is solved by minimising at least one conditional probability expressed in a Bayesian context.

According to an embodiment, at least one patch belongs to an image which does not comprise the block of pixels to predict.

According to an embodiment, the block of pixels to be predicted is predicted by applying the determined mapping on the neighbourhood of said block of pixels to be predicted.

According to an embodiment, more than one patch being considered, the step for predicting the block of pixels comprises the following sub-steps:

forming a patch with the neighborhood and the prediction block, searching in a search window at least one other patch similar to the formed patch and obtaining a final prediction of the block of pixels to be predicted from at least said at least one other patch.

According to an embodiment, in the course of the sub-step for searching, are considered the P patches which are the most similar, in term of content, to the patch formed with the neighborhood and the prediction block, and in the course of the sub-step for predicting the neighborhood of the block to be predicted is predicted by linear combining the neighbourhoods of the P patches, and the final prediction of the block of pixels to be predicted is then obtained by linear combinating the blocks of pixels of said P patches, said linear combination using the weighting coefficients used to predict the neighbourhood.

According to an embodiment, in the course of the sub-step for searching, a patch which is the most similar to the patch formed with the neighborhood and the prediction block is considered, and the (P−1) patches which are the most similar, in term of content, to said most similar patch are considered, and in the course of the sub-step for predicting the neighborhood of the block to be predicted is predicted by linear combining the neighborhoods of said (P−1) patches and the neighborhood of the most similar patch, and the final prediction of the block of pixels to be predicted is then obtained by linear combinating the blocks of pixels of said (P−1) patches and the block of pixels of the most similar patch, said linear combination using the weighting coefficients used to predict the neighbourhood.

According to an embodiment, a patch which is the most similar to a patch formed with the neighborhood and the prediction block is considered, and the block of pixels to be predicted is predicted by the block of pixels of said most similar patch.

The invention also relates to a method for coding a block of pixels of an image from at least the blocks of patches. The method is characterised in that the block of pixels is predicted according to one of the above method.

The invention also relates to a method for decoding a signal of coded data representing a block of pixels. The method is characterised in that the block of pixels is predicted according to one of the above method.

The invention also relates to apparatus for coding and decoding which comprises processing modules configured to predict the block of pixels according to one of the above methods.

The specific nature of the invention as well as other objects, advantages, features and uses of the invention will become evident from the following description of a preferred embodiment taken in conjunction with the accompanying drawings.

4. LIST OF FIGURES

Figure 2:
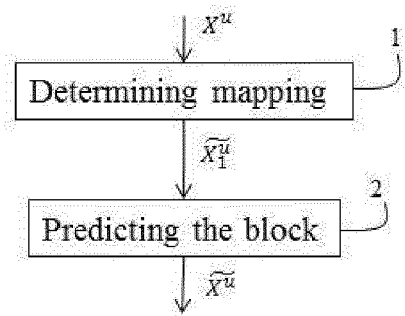
Figure 3:
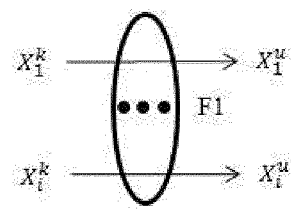
Figure 4:
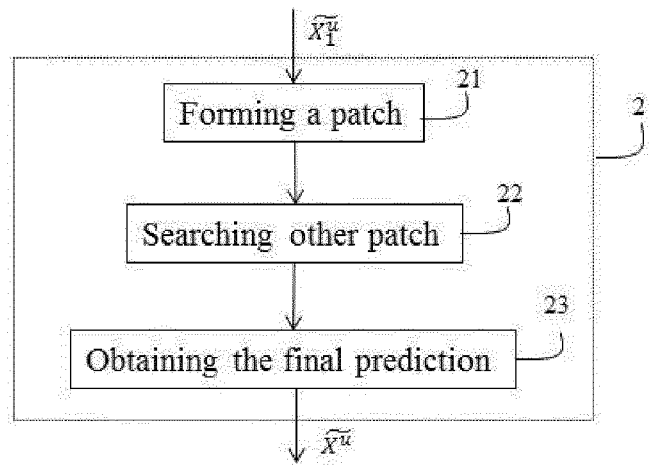
Figure 5:
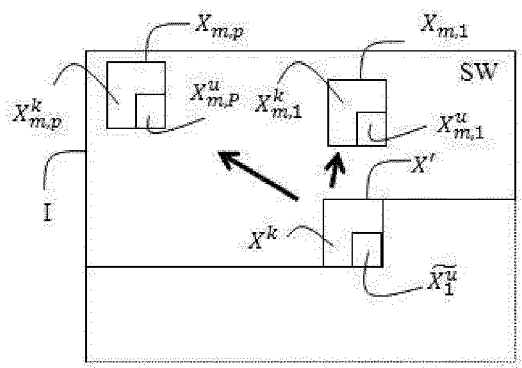
Figure 6:
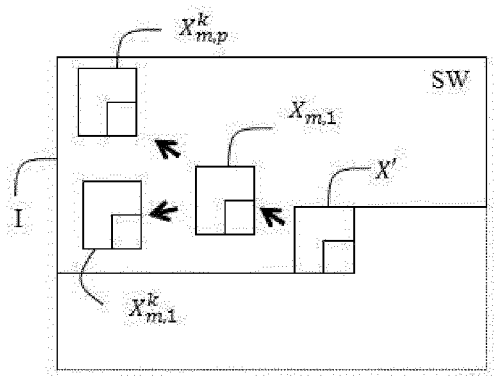
Figure 7:
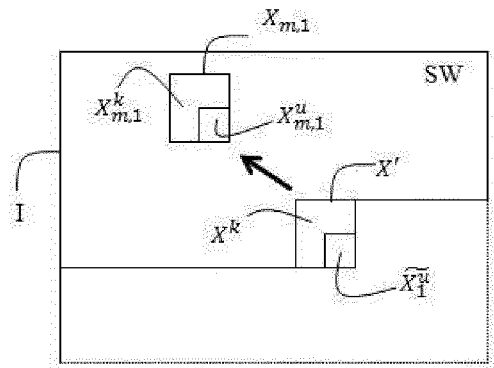
Figure 8:
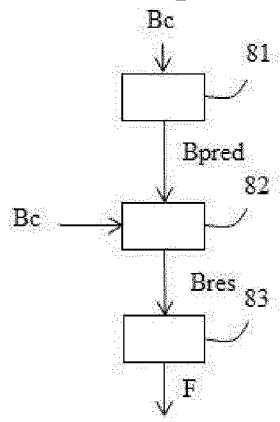
Figure 9:
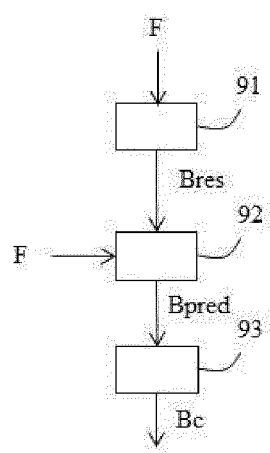
Figure 10:
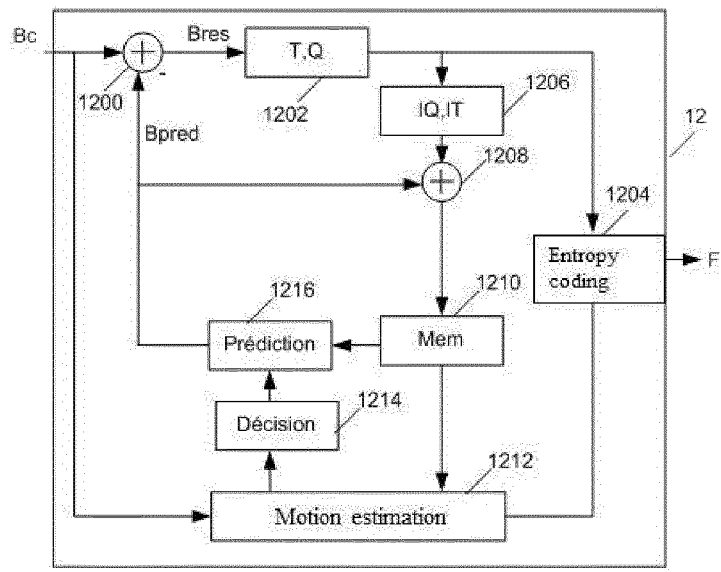
Figure 11:
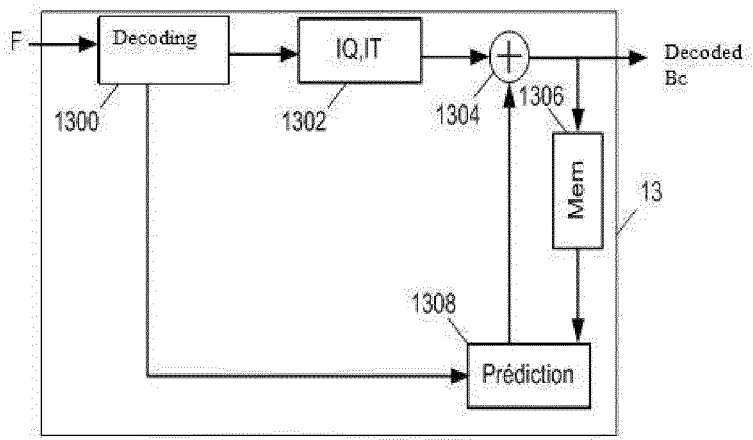
Figure 12:
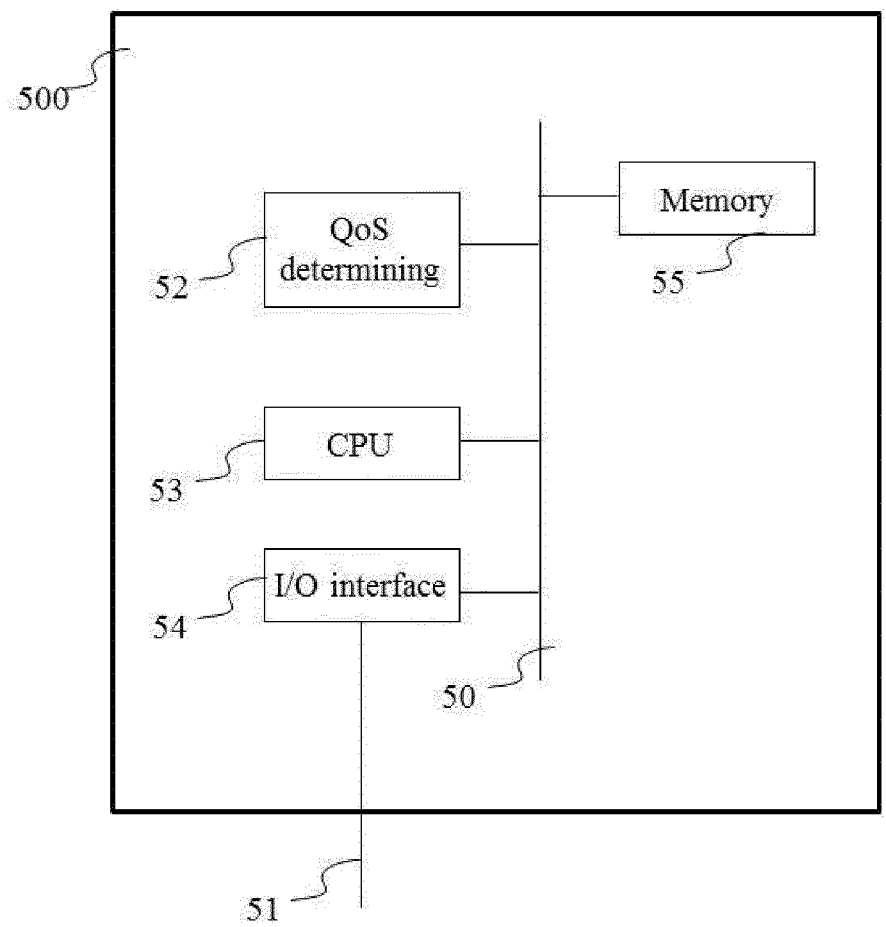

The embodiments will be described with reference to the following figures:

FIG. 1 shows an illustration of a patch according to the preferred embodiment of the invention, FIG. 2 shows a diagram of the steps of the method for predicting a block of pixels from at least one patch according to a preferred embodiment of the invention, FIG. 3 illustrates the method for predicting a block of pixels from at least one patch, FIG. 4 shows an embodiment of a steps of the method for predicting a block of pixels from at least one patch, FIG. 5-7 illustrates a variants of the method for predicting a block of pixels from at least one patch, FIG. 8 shows a diagram of the steps of the method for coding a block of pixels, FIG. 9 shows a diagram of the steps of the method for coding a block of pixels, FIG. 10 shows an example of a functional architecture of an apparatus for coding a block of pixels, FIG. 11 shows an example of a functional architecture of an apparatus for decoding a signal of coded data representing a block of pixels, FIG. 12 shows an example of an architecture of a device.

5. DETAILED DESCRIPTION OF A PREFERRED EMBODIMENT OF THE INVENTION

An image comprises pixels or image points with each of which is associated at least one item of image data. An item of image data is for example an item of luminance data or an item of chrominance data. In the following, the term "block of pixels" is used to designate a set of items of an image data.

As illustrated in FIG. 1, an input patch X is considered. This patch comprises a block of pixels to be predicted $X^u$ (unknown pixels) and a causal neighborhood $X^k$ around this block. A causal neighborhood is also called a template.

The pixels of a causal neighborhood around a block of pixels are usually said known because they belong to a reconstructed part SW of the image I. This part SW is usually called a search window. A patch $X_i$ comprises a block $X_i^u$ of n2 pixels at the same positions as the pixels of the block of pixels $X^u$ and a causal neighborhood $X_i^k$ of n1 pixels at the same positions as the pixels of the causal neighborhood $X^k$.

FIG. 2 shows a diagram of the steps of the method for predicting a block of pixels from at least one patch according to a preferred embodiment of the invention.

The method comprises, as illustrated in FIGS. 2 and 3, a step 1 for determining a mapping F1 of the causal neighborhood $X^k$ on the block of pixels to be predicted $X^u$ in order that the block of pixels $X_i^u$ of each patch $X_i$ is best predicted by mapping the neighbourhood $X_i^k$ of that patch $X_i$ on the block of pixels $X_i^u$.

In practice, the mapping F1 is determined from a set of patches which comprises more than one patch $X_1$. Potentially, a new set of patches is defined for each block of pixels to be predicted.

A set of patches $X_i$ is defined, for example, by considering all possible patches (blocks of pixels) in the search window SW (which is defined within a coded-decoded causal part of the image I). Optionally, only a reduced number of these patches are considered. The set of data points formed by the pixels of the template and the set of data points formed by the patches (template plus block of pixels) belong to two related manifolds. Determining the mapping of a causal neighborhood around a block of pixels on that block of pixels consists thus in "connecting" these two manifolds in order to make sure that a good approximation of the causal neighborhood around the block of pixels to be predicted leads to a good approximation of the patch (template plus block to be predicted).

According to an embodiment, the mapping F1 is determined by using a linear regression approach.

Mathematically speaking, the mapping is defined by a matrix W of coefficients defined as follows:

Considering N patches $X_i$ (i=1, ..., N) from the search window SW, each patch $X_i$ comprising a template $X_i^k$ and a block of pixels $X_i^u$ as before explained, the problem to solve is then given by:

$$X_i^u = \begin{bmatrix} X_{i,1}^u \\ \ldots \\ X_{i,n2}^u \end{bmatrix} = W^T \begin{bmatrix} X_{i,1}^k \\ \ldots \\ X_{i,n1}^k \end{bmatrix} = W^T \cdot X_i^k \quad (1)$$

where the n1×n2 matrix W maps the neighbourhood $X_i^u$ of a patch $X_i$ on the block of pixels $X_i^k$ of this patch.

Thus, the coefficients of the matrix W are determined in order to best predict the set of vectors forming the columns of a matrix $M^u$ from the set of vectors forming a matrix $M^k$:

$$M^u = W \cdot M^k + E$$

where E is a prediction error matrix for which each row is a noise vector given for example by:

$$e_i \sim N(0, \Sigma^2)$$

This is a problem of multivariate regression where a vector (of correlated random variables) is predicted rather than a single scalar random variable in the case of the well-known simple regression problem.

There exists multiple method to solve such a multivariate linear regression system in prior art and the invention is not restricted to any of these methods.

According to an embodiment, the problem of equation (1) is solved by least squares minimising at least one prediction error between the block of pixels of a patch and a block resulting of the mapping of the neighbourhood of that patch on said block of pixels.

Mathematically speaking, the coefficients of the matrice W are given by minimizing the following prediction error:

$$\|(M_u)^T - (M_k)^T W^T\|^2 \quad (2)$$

which brings together the prediction errors between the blocks of pixels of the patches and the blocks resulting of the mapping of the neighbourhoods of these patches on the blocks of pixels of these patches.

The minimization of the criteria of equation (2) is given by zeroing the derivative with respect to W which leads to the least squares estimator:

$$W = M_u M_k^T (M_k^T M_k^T)^\dagger$$

where the symbol † denotes the pseudo-inverse.

According to an embodiment, the problem of equation (1) is solved by minimising at least one conditional probability expressed in a Bayesian context.

In such a Bayesian context, one needs to estimate the model parameters W. For that, distributions of model parameter W and $\epsilon$ are defined by:

$$P(W, \epsilon | M^u, M^k) \propto P(\epsilon) P(W|\epsilon) P(M^u | M^k, W, \epsilon) \quad (3)$$

where $P(\epsilon)$ is an inverse-Wishart distribution, and $P(W|\epsilon)$ is a matrix normal distribution.

The conditional probability of $M^u$ given the observations $M^k$, and the unknown regression parameters W and $\epsilon$ is given by $$P(M^u | M^k, W, \epsilon) \propto (\epsilon^2)^{-n2/2} \exp(-\frac{1}{2} tr((Y - M^k W)^T \epsilon^{-1} (M^u - M^k W)))$$

The value of W which maximizes the likelihood (or minimizes the exponent of the above conditional probability) is the one given by $$\hat{W} = (M^{k^T} M^k)^{-1} M^{k^T} M^u$$

This is the classical unbiased estimate W of the regression parameters (matrix W). The value of $\epsilon$ which maximizes the likelihood is given by $\hat{\epsilon} = M^u - M^k \hat{W})^T (M^u - M^k \hat{W})$. The predicted value of $\widehat{M^u}$ of $M^u$ is then given by $\widehat{M^u} = M^k \hat{W}$.

The procedures to estimate the regression parameters from the above conditional probabilities are described in Chapters 7 and 8 of in Daniel B. Rowe, "Multivariate Bayesian Statistics, Models for Source Separation and Signal Unmixing", Chapman et Hall/CRC press company, 2003 1. Basically, there are two methods: computing the marginal posterior mean and the maximum a posteriori estimates. The marginal posterior mean estimation of the parameters involves computing the marginal posterior distribution for each of the parameters and then computing mean estimates from these marginal posterior distributions. To find the marginal posterior distribution of the matrix of the regression coefficients W, the joint posterior distribution (equation 3 must be integrated with respect to $\epsilon$. Given that the posterior distribution is of the same form as an inverted Wishart distribution distribution, the integration can be easily performed. The joint posterior distribution may also be maximized with respect to W and by direct differentiation.

According to an embodiment, at least one patch belongs to an image which does not comprise the block of pixels to be predicted. That means that the search window SW is defined not only in the image where the block of pixels to be predicted is located but also in at least one other either previous or following image or both.

The method also comprises a step 2 for predicting the block of pixels $X^u$ from a prediction block $\tilde{x}_1^u$ computed by applying the determined mapping F1 on the neighbourhood $X^k$ of the block of pixels to predict.

According to an embodiment, the block of pixels to be predicted is predicted by applying the determined mapping on the neighbourhood of said block of pixels to be predicted. In other words, the block $X^u$ is predicted by the prediction block $\tilde{x}_1^u$.

According to an embodiment illustrated in FIG. 4, the step 2 comprises a sub-step 21 for forming a patch X' with the neighborhood $X^k$ and the prediction block $\tilde{x}_1^u$, a sub-step 22 for searching in the search window SW at least one other patch $X_{m,p}$ similar to the patch X', and a sub-step 23 for obtaining a final prediction of the block of pixels to be predicted from at least said at least one other patch.

According to a variant illustrated in FIG. 5, in the course of the sub-step 22, the P patches $X_{m,p}$ (p∈{1, ..., P}) of n1 pixels each, which are the most similar, in term of content, to the patch X' are considered. The pixels of the neighborhood $X_{m,p}^k$ of each patch $X_{m,p}$ are located at the same positions as the pixels of the causal neighborhood $X^k$. The neighborhood $X_{m,p}^k$ defines a neighborhood around a block $X_{m,p}^u$ of n2 pixels. In the course of the sub-step 23, the neighborhood $X^k$ of the block to be predicted is predicted by linear combining the neighbourhoods $X_{m,p}^k$ of the P patches $X_{m,p}$, and the final prediction of the block of pixels to be predicted, called the final prediction block $\tilde{x}^u$, is then obtained by linear combinating the P blocks of pixels $X_{m,p}^u$. Said linear combination uses the weighting coefficients used to predict the neighbourhood $X^k$.

According to a variant illustrated in FIG. 6, in the course of the sub-step 22, the patch $X_{m,1}$ of n1 pixels, which is the most similar to the patch X' is considered, and the (P−1) patches $X_{m,p}$ (p∈{2, ..., P}) of n1 pixels each, which are the most similar, in term of content, to the most similar patch $X_{m,1}$ are considered. The pixels of the neighborhood $X_{m,p}^k$ of each patch $X_{m,p}$ are located at the same positions as the pixels of the causal neighborhood $X^k$. The neighborhood $X_{m,p}^k$ defines a neighborhood around a block $X_{m,p}^u$ of n2 pixels. In the course of the sub-step 23, the neighborhood $X^k$ of the block to predict is predicted by linear combining the (P−1) blocks $X_{m,p}^k$ of the patches $X_{m,p}$ and the neighborhood of the most similar patch, and the final prediction $\widetilde{X}^u$ of the block of pixels to be predicted is then obtained by linear combining the blocks of pixels $X_{m,p}^u$ of said (P−1) patches and the block of pixels of the most similar patch. Said linear combination uses the weighting coefficients used to predict the neighbourhood $X^k$.

For example, the weights used by such a linear combination of neighbourhoods are computed with a similarity kernel function in order to give higher weights to neighbourhoods which are more similar to the neighbourhood (A. Wong and J. Orchard, "A nonlocal-means approach to exemplar-based inpainting," in *IEEE int. Conf image Process. (ICIP)*, 2006, pp. 2600-2603).

According to a variant, the weighting coefficient relative to a block $X_{m,p}^u$ may also depends on the distance in the image I of that block with the block of pixels to predict.

Mathematically speaking, the final prediction block $\widetilde{X}^u$ is given by:

$$\tilde{X}^u = \sum_{p=1}^{P} \alpha_p X_{m,p}^u$$

with $$\alpha_p = \exp\left(-\frac{\|x^k - x_{m,p}^k\|_2^2}{h}\right)$$

et h is a decay coefficient and under the constraint that $\Sigma_p \alpha_p = 1$.

According to a variant illustrated in FIG. 7, a patch $X_{m,1}$ which is the most similar to a patch X' formed with the neighborhood $X^k$ and the prediction block $\widetilde{X}_1^u$ is considered, and the block of pixels to be predicted is predicted by the block of pixels of said most similar patch.

Multiple criteria exist in the art to quantify the similarity in term of visual content of two blocks of pixels (including templates and patches). For example an Euclidean distance between the pixels of the blocks may be used as a similarity measure for example. But the invention is not restricted to such a particular similarity measure.

A patch $X_{m,p}$ minimizes an euclidean distance with a patch X when:

$$m = \underset{i \in \{1,\ldots,M\}}{\mathrm{argmin}}\{d_i\}$$

where $d_i = \|X - X_{m,p}\|_2^2$ and M the number of all (or some of them) possible patch of pixels in the search window SW.

The invention concerns also a method for coding an image potentially belonging to a sequence of images.

The term "motion" designates data relative to any motion. They comprises motion vectors and potentially the indexes of a reference image which allow the identification of that reference image in a sequence of images. They also comprise information indicating the interpolation type which is applied to a reference block to get a prediction block.

The term "residue" designates the data obtained after extraction of other data. The extraction is generally a subtraction of prediction pixels from source pixels. However, the extraction is more general and comprises notably a weighted subtraction.

The term "transformed residual data" designate residual data on which a transform has been applied. A DCT (Discrete Cosine Transform) is an example of such a transform and is described the chapter 3.4.2.2 of the book of I. E. Richardson intitulé "H.264 and MPEG-4 video compression" published in J. Wiley & Sons en September 2003. The wavelet transform described in the chapter 3.4.2.3 in the book of I. E. Richardson and the Hadamard transform are some other examples of transforms which may also be used.

Such transforms <<transform>> a block of image data, for example residual data of luminance and/or chrominance, to a "transformed data block" also called "frequency data block" or "coefficient block". A coefficient block comprises usually a low-frequency coefficient also called DC coefficient and high-frequency coefficients also called AC coefficients.

The term "prediction data" designate data used to predict other data. A prediction block is a block of pixels with associated prediction data. A prediction block of an image is obtained from one or more reference block of that image (spatial or intra-prediction) or from one or more reference block of another image (monodirectional temporal prediction) or multiple reference blocks belonging to more than one different image (birectional temporal prediction).

The term "reconstructs" designates data (for example pixels, blocks) obtained after merging of residues with prediction data. The merge is generally a sum of prediction pixels with residues. However, the merging is more general and comprises notably the weighted sum. A reconstructed block is a block of reconstructed pixels.

In reference to image decoding, the terms "reconstruction" and "decoding" are very often used as being synonymous. Thus, a "reconstructed block" is also designated under the terminology of "decoded block".

FIG. 8 shows a diagram of the steps of a method for coding a block of pixels Bc of an image.

In the course of a step 81, a prediction block Bpred is determined from motion data outputted a well-known block-based motion estimation process (<<blocks matching>>). However, the invention is not restricted by the use of such a process to determine a prediction Bpred.

In the course of a step 82, a residual block Bres is determined by extracting the prediction block Bpred from the current block of pixels Bc.

For example, the residual block Bres equals the difference pixel by pixel of the current block of pixels Bc and the prediction block Bpred.

In the course of a step 83, the residual block Bres and potentially the motion data relative to the prediction block are encoded to a signal F of coded data.

Usually, the step 83 comprises, before entropy encoding, a transformation of the residual block Bres to a block of coefficients followed by a quantization of said block of coefficients using a quantization parameter.

According to a variant, the residual block Bres is only quantified before entropy encoding.

For example, the residual block Bres, possibly transformed and quantified, is encoded according to a well-known entropy coding process such a VLC-type (Variable Length Coding), using for examples determined VLC tables such as describes in chapter 3.5.2 of the book of I. E. Richardson titled <<H.264 and MPEG-4 video compression>> published in J. Wiley & Sons in September 2003.

According to a variant, a CABAC-type process (acronyme anglais de <<Context-based Adaptive Binary Arithmetic Coding>>) may be used as described in the chapter 6.5.4. of the book of I. E. Richardson or in section 9.3 of the document ISO/IEC 14496-10 titled <<Information technology—Coding of audio-visual objects—Part 10: Advanced Video Coding>>.

According to a variant, a CAVLC-type process (<<Context-based Adaptive Variable Length Coding>>) may be used as described in section 9.2 of the ISO/IEC 14496-10 titled <<Information technology—Coding of audio-visual objects—Part 10: Advanced Video Coding>> or in chapter 6.4.13.2 in the book of I. E. Richardson.

FIG. 9 is a diagram of the steps of a method for decoding a signal of coded data F representing a block of pixels of an image. The method comprises a step 91 for obtaining a residual block Bres by decoding a part of the signal F of coded data. The step 91 comprises usually an entropy decoding this part of the signal F. The decoded data comprise usually residual data which have been transformed and quantified, i.e. quantified coefficients. In that case, in the course of the step 91, the quantified coefficients extracted from the signal F are entropy decoded and inverse quantified to obtain the residual block Bres.

According to a variant, if the data extracted from the signal F comprises residual data which have been only quantified, the residual block Bres is only inverse quantified. The invention is not restricted by the process used to obtain to residual block Bres.

The method for decoding also comprises a step 92 for determining a prediction block Bpred for the block of pixels to decode from the signal F. As an example, the prediction block Bpred is determined from motion data by decoding a part of the signal of coded data F relative to the block of pixels to decode.

According to a variant, the prediction block Bpred is determined from motion data reconstructed from a template matching process. Such a process is, for example, described in the document VCEG-AG16 of Steffen Kamp et al. titled Decoder Side Motion Vector Derivation et publié le 20 October 2007 at Shenzhen in China, $33^{iéme}$ meeting of the group VCEG of l'ITU-T.

The method for decoding also comprises a step 93 for decoding (or reconstructing) the block of pixels by merging the residual block Bres with the prediction block Bpred.

As an example, the decoded block of pixels equals the sum pixel to pixel of the residual block Bres and the prediction block Bpred.

The method for encoding and decoding described in relation with the FIGS. 8 and 9, may be used to encode a complete image or a sequence of images. Each image belongs to a sequence of images, each image is divided into block of pixels and each block of pixels is encoded using the method described in relation with FIG. 8. The signal F, then, comprises coded data for each block of each image and each block of each image is then decoded from the signal F using a method of decoding as described in relation with FIG. 9.

FIG. 10 shows an embodiment of an apparatus for coding a block of pixels.

The apparatus 12 receives a block of pixels Bc to encode as input.

The apparatus 12 is described in term of functional modules which implement at least a temporal prediction based coding method.

Only the functional modules of the apparatus 12 in relation with the temporal prediction based coding (INTER coding) are shown in FIG. 10. The other modules, not shown, which are well-known in prior art, implement for example an INTRA coding with or without spatial prediction.

The apparatus 12 comprises a module 1200 for extracting, for example on a pixel base, a prediction block Bpred from a current block of pixels Bc to generate a residual block Bres. The apparatus 12 also comprises a module 1202 configured to transform and quantify the residual block Bres. The transform T is, for example, a Discrete Cosinus Transform (DCT) or any other block-based transform such a wavelet-based. The apparatus 12 further comprises a module 1206 which implement the inverse operations: inverse quantization $Q^{-1}$ followed by an inverse transform $T^{-1}$. The apparatus 12 further comprises a module 1204 for entropy encoding the quantified data to a signal F of coded data. The module 1206 is linked to a module 1208 which merges, for example on a pixel-based, the block of pixels outputting the module 1206 and the prediction block Bpred to generate a block of reconstructed data which is stored in a memory 1210.

The apparatus 12 comprises also a module 1212 to estimate at least one motion vector between the block of pixels Bc and a block of pixels of a reference image Ir stored in the memory 1210, this reference image having been coded and reconstructed.

According to a variant, the motion estimation may be executed between the block of pixels Bc and a block of pixels of an original reference image Ic. In that case, the memory 1210 is not linked to the module 1212.

According to a well-known process, the motion estimation searches in the reference image Ir (or Ic) a motion data, such for example a motion vector, in order to minimise an error computed between a block of pixels Bc and a block of pixels in that reference image identified by the motion data.

The motion data are then transmitted by the module 1212 to a decision module 1214 which selects a coding mode for the block of pixels Bc from a set of determined coding modes. The selected coding mode is for example the coding mode which minimizes a criterion such a rate-distrosion based criterium. However, the invention is not limited to any process to select a coding mode which may be selected using any other criterium.

The selected coding mode and the motion data are transmitted to the module 1204 for entropy encoding in the signal F.

The module 1216 determines the prediction block Bpred from the selected coding mode outputting the module 1214 and, potentially, from motion data outputting the module 1212.

The module 1216 is configured to implement a prediction method as described in relation with FIG. 8.

FIG. 11 shows an embodiment of an apparatus for decoding a signal F of coded data representing a block of pixels of an image.

The apparatus 13 receives a signal F as an input. The signal F of coded data, for example, has been transmitted by an apparatus as described in relation with FIG. 10 via a communication path.

The apparatus 13 comprises a module 1300 to generate decoded data, for example coding modes or residual data relative to coded data to decode.

The apparatus 13 further comprises a module to decode motion data.

According to an embodiment, this module is the module 1300 which entropy decode a part of the signal F of coded data relative to the coding mode and potentially motion data.

According to a variant, not shown, the module to decode motion data is configured to implement a motion estimation process. This solution to decode the motion data is known as a template matching process in the prior art.

The decoded data relative to the block of pixels to decode are then transmitted to a module 1302 which applies an inverse quantisation followed by an inverse transform. The module 1302 is identical to the module 1206 of the apparatus 12. The module 1302 is linked to the module 1304 which merges, for example on a pixel by pixel base, the residual block outputting the module 1302 and a prediction block to generate a decoded block of pixels Bc (also said reconstructed block) which is then stored in a memory 1306. The apparatus 13 also comprises a module 1308 which determines a prediction block Bpred from the coding mode extracted from the signal F for the block of pixels to decode, and potentially, from motion data determined outputting the module which reconstructs the motion data.

The module 1308 is configured to implement a prediction method as described in relation with FIG. 9.

On FIGS. 10 and 11, the modules are functional units, which may or not be in relation with distinguishable physical units. For example, these modules or some of them may be bring together in a unique component or circuit, or contribute to functionalities of a software. A contrario, some modules may be potentially be composed of separate physical entities. The apparatus which are compatible with the invention are implemented using either pure hardware, for example using dedicated hardware such ASIC or FPGA or VLSI, respectively <<Application Specific Integrated Circuit>>, <<Field-Programmable Gate Array>>, <<Very Large Scale Integration>>, or from several integrated electronic components embedded in a device or from a brend of hardware and software components.

FIG. 12 shows a device 500 that can be used in a system that implements the method of the invention. The device comprises the following components, interconnected by a digital data- and address bus 50:

- a processing unit 53 (or CPU for Central Processing Unit);
- a memory 55;
- a network interface 54, for interconnection of device 500 to other devices connected in a network via connection 51.

Processing unit 53 can be implemented as a microprocessor, a custom chip, a dedicated (micro-) controller, and so on. Memory 55 can be implemented in any form of volatile and/or non-volatile memory, such as a RAM (Random Access Memory), hard disk drive, non-volatile random-access memory, EPROM (Erasable Programmable ROM), and so on. Device 500 is suited for implementing a data processing device according to the method of the invention. The data processing device 500 and the memory 55 work together for determining a mapping F1 of a causal neighborhood around that block of pixels on the block of pixels to predict in order that the block of pixels of each patch is best predicted by mapping the neighbourhood of that patch on the block of pixels of that patch, and for predicting the block of pixels from a prediction block computed by applying the determined mapping (F1, W) on the neighbourhood of the block of pixels to predict.

The processing unit and the memory of the device 500 are also configured to implement any embodiment and/or variant of the coding and decoding methods describes in relation to FIGS. 8 and 9.

While not explicitly described, the present embodiments and variants may be employed in any combination or sub-combination.

The invention claimed is:

1. A method for predicting a block of pixels comprising:
    forming a first patch with a neighborhood around the block of pixels to be predicted;
    searching in a search window at least one other patch similar to the first patch, each patch comprising a block of pixels and a causal neighborhood around that block of pixels; and
    obtaining a final prediction of the block to be predicted from said at least one other patch;
    wherein the method further comprises:
    determining a mapping of a causal neighborhood of a patch, on the block of pixels of said patch in order that the block of pixels of at least one training patch is best predicted by mapping the causal neighborhood of that training patch on the block of pixels of that training patch, and
    predicting the block of pixels from a prediction block computed by applying the determined mapping on the neighborhood of the block of pixels to predict, where in the course of the sub-step for searching, a patch which is the most similar to the patch formed with the neighborhood and the prediction block is considered, and the patches which are the most similar, in terms of content, to said most similar patch are considered; and
    adding said prediction block to the first patch.

2. The method as claimed in claim 1, wherein the mapping is determined by using a linear regression approach.

3. The method as claimed in claim 2, wherein the linear regression problem is solved by least squares minimizing at least one prediction error between the block of pixels of a training patch and a block resulting of the mapping the neighborhood of that training patch on said block of pixels.

4. The method as claimed in claim 2, wherein the linear regression problem is solved by minimizing at least one conditional probability expressed in a Bayesian context.

5. The method as claimed in claim 1, wherein at least one training patch belongs to an image which does not comprise the block of pixels to predict.

6. The method as claimed in claim 1, where in the course of the sub-step for searching, are considered the P patchs which are the most similar, in term of content, to the patch formed with the neighborhood and the prediction block, and in the course of the sub-step for predicting the neighborhood of the block to be predicted is predicted by linear combining the neighborhoods of the P patchs, and the final prediction of the block of pixels to be predicted is then obtained by linear combinating the blocks of pixels of said P patches, said linear combination using the weighting coefficients obtained by linear combining the neighborhoods of the P patchs.

7. The method as claimed in claim 1, where in the course of the sub-step for predicting the neighborhood of the block to be predicted is predicted by linear combining the neighborhoods of said patchs and the neighborhood of the most similar patch, and the final prediction of the block of pixels to be predicted is then obtained by linear combinating the blocks of pixels of said patches and the block of pixels of the most similar patch, said linear combination using the weighting coefficients obtained by linear combining the neighborhoods of said patchs and the neighborhood of the most similar patch.

8. The method as claimed in claim 1, wherein a patch which is the most similar to a first patch formed with the neighborhood and the prediction block is considered, and the block of pixels to be predicted is predicted by the block of pixels of said most similar patch.

9. A method for coding a block of pixels of an image from at least the blocks of patchs, wherein the block of pixels is predicted according to the method which conforms to claim 1.

10. A method for decoding a signal of coded data representing a block of pixels, wherein the prediction is obtained according to the method which conforms to claim 1.

11. An apparatus for coding a block of pixels of an image from at least the blocks of patchs, wherein it comprises a processor configured to predict the block of pixels according to the method which conforms to claim 1.

12. An apparatus for decoding a signal of coded data representing a block of pixels, wherein it comprises a processor configured to predict the block of pixels according to the method which conforms to claim 1.

* * * * *